(12) United States Patent
Rech et al.

(10) Patent No.: US 11,189,176 B2
(45) Date of Patent: Nov. 30, 2021

(54) METHOD, DEVICES AND COMPUTER PROGRAM FOR INITIATING OR CARRYING OUT A COOPERATIVE DRIVING MANEUVER

(71) Applicant: VOLKSWAGEN AKTIENGESELLSCHAFT, Wolfsburg (DE)

(72) Inventors: Bernd Rech, Bokensdorf (DE); Stefan Gläser, Braunschweig (DE); Monique Engel, Braunschweig (DE); Bernd Lehmann, Wolfsburg (DE); Sandra Kleinau, Rötgesbüttel (DE); Hendrik-Jörn Günther, Hannover (DE); Teodor Buburuzan, Braunschweig (DE); Axel Köhnke, Dülmen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/086,929

(22) PCT Filed: Mar. 15, 2017

(86) PCT No.: PCT/EP2017/056121
§ 371 (c)(1),
(2) Date: Sep. 20, 2018

(87) PCT Pub. No.: WO2017/167580
PCT Pub. Date: Oct. 5, 2017

(65) Prior Publication Data
US 2019/0098471 A1    Mar. 28, 2019

(30) Foreign Application Priority Data
Mar. 29, 2016   (DE) ................ 10 2016 205 142.3

(51) Int. Cl.
| | | |
|---|---|---|
| G08G 1/00 | (2006.01) | |
| G08G 1/16 | (2006.01) | |
| H04W 4/46 | (2018.01) | |

(52) U.S. Cl.
CPC ............ G08G 1/22 (2013.01); G08G 1/162 (2013.01); G08G 1/167 (2013.01); H04W 4/46 (2018.02); *G08G 1/166* (2013.01)

(58) Field of Classification Search
CPC ...... G08G 1/166; G08G 1/167; G08G 1/0112; G08G 1/012; G08G 1/0133; G08G 1/0141;
(Continued)

(56) References Cited

U.S. PATENT DOCUMENTS 8,810,431 B2    8/2014 Mudalige et al.
9,550,528 B1 *  1/2017 Hakeem ............... G08G 1/162
(Continued)

FOREIGN PATENT DOCUMENTS

| CN | 102066185 A | 5/2011 |
|---|---|---|
| CN | 102431556 A | 5/2012 |

(Continued)

OTHER PUBLICATIONS

Search Report for German Patent Application No. 10 2016 205 142.3; dated Jan. 20, 2017.
(Continued)

*Primary Examiner* — Golam Sorowar
(74) *Attorney, Agent, or Firm* — Barnes & Thornburg LLP

(57) ABSTRACT

A method, devices and computer program for initiating and/or carrying out a cooperative driving maneuver. The method includes a driving intention message for transportation vehicles in an environment of a transportation vehicle which includes information relating to an intention of a
(Continued)

driver or an at least partially automatic transportation vehicle control system of the transportation vehicle to carry out a driving maneuver. The method includes obtaining information relating to a driving intention based on the intention to carry out the driving maneuver, determining a position of the transportation vehicle, determining the driving intention message based on the information relating to the driving intention, and calculating transmission parameters for the driving intention message. The transmission parameters include a repetition rate and a transmission time, and the calculation is based on a desired probability of receipt of the driving intention message, the driving intention, and the position of the transportation vehicle.

14 Claims, 6 Drawing Sheets

(58) Field of Classification Search
CPC ....... G08G 1/096716; G08G 1/096725; G08G 1/096741; G08G 1/096775; G08G 1/133; G08G 1/161; G08G 1/162; G08G 1/163; G08G 1/164; B60W 30/08; B60W 10/04; B60W 10/18; B60W 10/20; B60W 2050/008; B60W 2550/30; B60W 2550/402; B60W 2710/18; B60W 2710/20; B60W 2720/10; B60W 2900/00; B60W 30/18163; H04W 4/021; H04W 4/44; H04W 4/90
See application file for complete search history.

(56) References Cited

U.S. PATENT DOCUMENTS

| | | | |
|---|---|---|---|
| 2013/0099911 A1* | 4/2013 | Mudalige | G08G 1/163 340/438 |
| 2013/0158800 A1 | 6/2013 | Trageser | |
| 2014/0107867 A1* | 4/2014 | Yamashiro | G05D 1/0293 701/2 |
| 2015/0254977 A1* | 9/2015 | Grabow | G08G 1/163 340/903 |
| 2015/0327028 A1* | 11/2015 | Zhang | H04W 4/46 455/452.1 |
| 2016/0318511 A1* | 11/2016 | Rangwala | B60W 30/09 |

FOREIGN PATENT DOCUMENTS

| | | |
|---|---|---|
| CN | 102750837 A | 10/2012 |
| CN | 103065500 A | 4/2013 |
| CN | 104960524 A | 10/2015 |
| CN | 105261236 A | 1/2016 |
| DE | 19910153 A1 | 1/2001 |
| DE | 102005026693 A1 | 6/2006 |
| DE | 102008040566 A1 | 1/2010 |
| DE | 102012218935 A1 | 4/2013 |
| DE | 102012210344 A1 | 12/2013 |
| DE | 102013001326 A1 | 7/2014 |
| DE | 102013013799 A1 | 2/2015 |
| DE | 102013217434 A1 | 3/2015 |
| DE | 102014002116 A1 | 8/2015 |
| DE | 102014204333 A1 | 9/2015 |
| DE | 102014105474 A1 | 10/2015 |
| DE | 112009001028 B4 | 5/2017 |
| JP | 2016020125 A | 2/2016 |
| KR | 20150106260 A | 9/2015 |
| WO | 9963502 A2 | 12/1999 |
| WO | 2009138942 A2 | 11/2009 |

OTHER PUBLICATIONS

Search Report for International Patent Application No. PCT/EP2017/056121; dated Jun. 9, 2017.

* cited by examiner

METHOD, DEVICES AND COMPUTER PROGRAM FOR INITIATING OR CARRYING OUT A COOPERATIVE DRIVING MANEUVER

PRIORITY CLAIM

This patent application is a U.S. National Phase of International Patent Application No. PCT/EP2017/056121, filed 15 Mar. 2017, which claims priority to German Patent Application No. 10 2016 205 142.3, filed 29 Mar. 2016, the disclosures of which are incorporated herein by reference in their entireties.

SUMMARY

Illustrative embodiments relate to methods, devices and a computer program for initiating and/or implementing a cooperative driving maneuver, more specifically, but not exclusively, based on driving intention messages which are provided via vehicle-to-vehicle communication.

BRIEF DESCRIPTION OF THE DRAWINGS

Exemplary embodiments are described in detail below based on the drawings, to which exemplary embodiments are not generally limited, however. In the figures.

DETAILED DESCRIPTION

Figure 1:
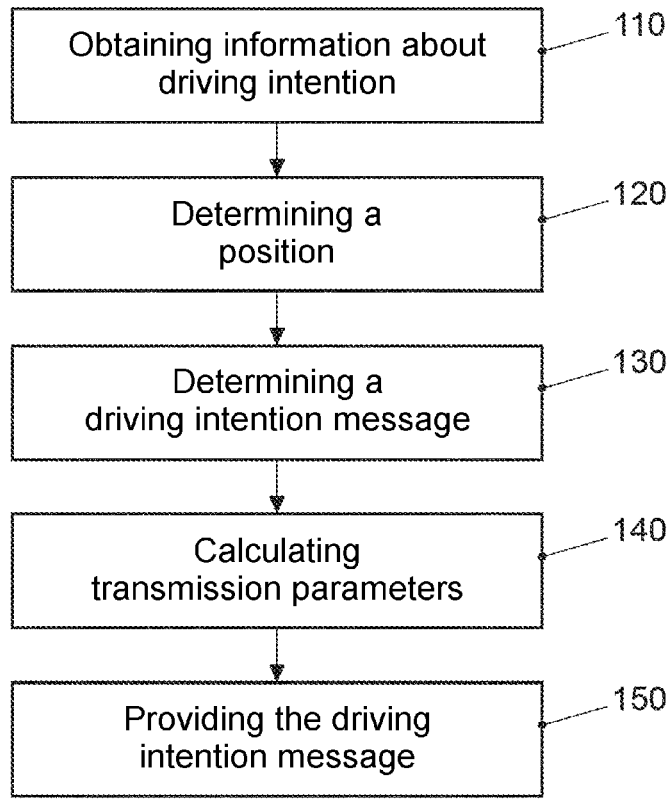
FIG. 1 illustrates a flow diagram of an exemplary embodiment of a method for initiating a cooperative driving maneuver.

Vehicle-to-vehicle communication (also Car2Car, C2C, or Vehicle2Vehicle, V2V) and vehicle-to-infrastructure communication (also Car2Infrastructure, C2I or Vehicle2Roadside, V2R) are a focal point of automotive research in the 21st century. The communication between transportation vehicles or between transportation vehicles or transport infrastructure allows a multitude of novel possibilities, such as a co-ordination between transportation vehicles or a communication of transportation vehicles with the transport infrastructure, for example, to provide traffic jam warnings to the transportation vehicles. In this situation, the transportation vehicles which are designed for C2C or C2I (also grouped together under vehicle-to-X communication, Car2X, C2X or vehicle2X, V2X) have a transmitting and receiving unit to be able to communicate with other transportation vehicles, for example, via direct radio connections or mobile radio networks. Such communication can be limited, for example, between transportation vehicles or between transportation vehicles and transport infrastructure within a radius of a few hundred meters.

A coordination of transportation vehicles, for example, for the cooperative implementation of maneuvers or for the co-ordination of automated transportation vehicles, is often dependent on the quality of the information about the transportation vehicles which is available in an environment. If transportation vehicles are equipped with vehicle-to-vehicle communication systems, then these can often be co-opted for use in cooperative driving situations.

There is a need for an improved approach to supporting cooperative driving functions. This need is met by the methods and devices in accordance with the independent claims.

Exemplary embodiments create a method for initiating a cooperative driving maneuver. If a transportation vehicle in at least some exemplary embodiments intends to perform a driving maneuver, such as a lane change, then the method can provide driving intention messages via a vehicle-to-vehicle interface to other transportation vehicles in the environment, for example, to inform the latter that the transportation vehicle would like to carry out the maneuver. To enable an increased reception probability, transmission parameters are also calculated, for example, a repetition rate or a transmission time, depending on the position and driving intention. Based on these transmission parameters, the driving intention message is then transmitted to the transportation vehicles in an environment of the transportation vehicle as a direct vehicle-to-vehicle message.

Exemplary embodiments create a method for initiating a cooperative driving maneuver by providing a driving intention message for transportation vehicles in an environment of a transportation vehicle. The driving intention message includes information about an intention of a driver, or an at least partially automatic transportation vehicle control system, of the transportation vehicle to carry out a driving maneuver. The method comprises obtaining information about a driving intention. The driving intention is based on the intention to carry out the driving maneuver. The method further comprises determining a position of the transportation vehicle. The method also comprises determining the driving intention message, based on the information about the driving intention. The method also comprises calculating transmission parameters for the driving intention message. The transmission parameters comprise a repetition rate and a time of transmission. The calculation of the transmission parameters is based on a desired reception probability of the driving intention message, the driving intention and the position of the transportation vehicle. The method also comprises providing the driving intention message as a direct vehicle-to-vehicle message for the transportation vehicles in the environment of the transportation vehicle based on the transmission parameters. The provision of the driving intention message can enable a cooperation of transportation vehicles to facilitate or simplify a driving maneuver, such as a lane change operation. The calculation of the transmission parameters enables an improvement in a transmission probability of the driving intention message, by the transmission being adapted, for example, according to the situation and/or based on the driving intention.

In some exemplary embodiments the method can also comprise receiving a message about acceptance of the cooperative driving maneuver as a response to the driving intention message, from at least one of the transportation vehicles in the environment of the transportation vehicle. The calculation of the transmission parameters may also be based on the message about the acceptance of the cooperative driving maneuver. The receipt of the message about the acceptance of the cooperative driving maneuver may enable the transportation vehicle to carry out the cooperative driving maneuver with the accepting transportation vehicle. The calculation of the transmission parameters based on the message about the acceptance of the cooperative driving maneuver may also enable an adjustment of the transmission rate (or, for example, a spatially targeted transmission), for example, to reduce the total number of messages and therefore the utilization rate of the radio resources.

In some exemplary embodiments, the method can also comprise carrying out the cooperative driving maneuver, based on the driving intention message and based on the message about the acceptance of the cooperative driving maneuver. The implementation of the cooperative driving maneuver can increase driving safety and enable the transportation vehicle (or a driver of the transportation vehicle) to carry out the driving maneuver more easily.

In at least some exemplary embodiments, the information about the driving intention can comprise information about at least one intention from the set of Single lane change to the left, Single lane change to the right, Double lane change to the left, Double lane change to the right, Triple lane change to the left, Triple lane change to the right, Turning left, Turning right, Pulling out from a parking space and Parking the transportation vehicle. Signaling of the driving intention for transportation vehicles in an environment of the transportation vehicle enables cooperative driving maneuvers and can improve traffic flow.

In at least some exemplary embodiments, determining the driving intention message can also be based on the position of the transportation vehicle. The driving intention message may also comprise information about the position of the transportation vehicle and/or information about a driving lane currently used by the transportation vehicle. Determining the driving intention message based on the position of the transportation vehicle can enable the consideration of road incidents and/or the inclusion of absolute or relative positions of transportation vehicles.

In some exemplary embodiments, the method can also comprise calculating information about a planned implementation of the driving maneuver, based on the position of the transportation vehicle. The information about the planned implementation of the driving maneuver can comprise information about at least one element of the set of first possible lane change point, planned lane change point, last possible lane change point, and phase of the driving maneuver. The driving intention message may also comprise the information about the planned implementation of the driving maneuver. The provision of the information about the planned implementation of the driving maneuver can enable a better co-ordination of the cooperative driving maneuver and/or allow a relevance assessment for the transportation vehicles in the surrounding area, i.e., an assessment of whether the driving intention message is relevant to them.

Exemplary embodiments also create a method for a transportation vehicle for carrying out a cooperative driving maneuver. The method comprises obtaining a driving intention message from a requesting transportation vehicle. The driving intention message comprises information about an intention of a driver, or of an at least partially automatic transportation vehicle control system, of the transportation vehicle to carry out a driving maneuver. The method also comprises receive one or more other driving intention messages of transportation vehicles in an environment of the transportation vehicle. The one or more other driving intention messages comprise information about one or more driving intentions of the transportation vehicles in an environment of the transportation vehicle. The method also comprises calculating the cooperative driving maneuver based on the driving intention message of the requesting transportation vehicle and on the one or more other driving intention messages of the transportation vehicles in an environment of the transportation vehicle. The calculation of the cooperative driving maneuver comprises checking whether the cooperative driving maneuver is compatible with the one or more driving intentions of the transportation vehicles in an environment of the transportation vehicle. The method also comprises providing a driving assistance to implement the cooperative driving maneuver, provided the cooperative maneuver is compatible with the one or more further driving intention messages of the transportation vehicles in an environment of the transportation vehicle. The method can enable an implementation of the cooperative driving maneuver, for example, allowing for possible further driving intention messages of other transportation vehicles, for example, to be better able to coordinate driving maneuvers in the event of incompatibility of a plurality of driving intentions, and/or to improve traffic flow.

In some exemplary embodiments, the method can also comprise obtaining information about a driving intention on the part of the transportation vehicle. The calculation of the cooperative driving maneuver may also be based on the information about the transportation vehicle's own driving intention. The checking operation can also check whether the cooperative driving maneuver is compatible with the transportation vehicle's own driving intention. The provision can also be based on whether the cooperative driving maneuver is compatible with the transportation vehicle's own driving intention. The allowance for the transportation vehicle's own driving intention can enable a continuing co-ordination and cooperation, for example, by allowing driving maneuvers over a plurality of driving lanes.

In at least some exemplary embodiments the driving maneuver can be a simple lane change maneuver to the left. The calculation of the cooperative driving maneuver can calculate the cooperative driving maneuver in such a way that the cooperative driving maneuver comprises a double lane change of the transportation vehicle to the left, if the driving intention on the part of the transportation vehicle comprises a lane change to the left, for example, to facilitate the Single lane change to the left of the requesting transportation vehicle. This allows, for example, a traffic flow to be increased and braking by one or both of the road users to be prevented.

Exemplary embodiments also create a device for a transportation vehicle. The device is designed for initiating a cooperative driving maneuver by providing a driving intention message for transportation vehicles in an environment of the transportation vehicle. The driving intention message comprises information about an intention of a driver, or an at least partially automatic transportation vehicle control system, of the transportation vehicle to carry out driving maneuvers. The device comprises an interface, designed to obtain information about a driving intention. The driving intention is based on the desire of the driver to carry out the driving maneuver. The device also comprises a positioning module, designed to determine a position of the transportation vehicle. The device also comprises a control module which is designed for controlling the interface, the positioning module and a vehicle-to-vehicle interface. The control module is also designed to determine the driving intention message, based on the information about the driving intention. The control module is also designed to calculate transmission parameters for the driving intention message. The transmission parameters comprise a repetition rate and a time of transmission. The control module is designed to calculate the transmission parameters based on a desired reception probability of the driving intention message, the driving intention and the position of the transportation vehicle. The control module is also designed to provide the driving intention message as a direct vehicle-to-vehicle message via the vehicle-to-vehicle interface for the transportation vehicles in the environment of the transportation vehicle based on the transmission parameters.

Examples also create a device for a transportation vehicle, for carrying out a cooperative driving maneuver. The device comprises a vehicle-to-vehicle interface, designed to obtain a driving intention message from a requesting transportation vehicle. The driving intention message comprises information about an intention of a driver, or of an at least partially automatic transportation vehicle control system, of the transportation vehicle to carry out a driving maneuver. The vehicle-to-vehicle interface is also designed to receive one or more further driving intention messages from transportation vehicles in an environment of the transportation vehicle. The one or more further driving intention messages comprise information about one or more driving intentions of the transportation vehicles in an environment of the transportation vehicle. The device also comprises a control module which is designed for controlling the vehicle-to-vehicle interface and an interface. The control module is also designed for calculating the cooperative driving maneuver based on the driving intention message of the requesting transportation vehicle and on the one or more further driving intention messages of the transportation vehicles in an environment of the transportation vehicle. The calculation of the cooperative driving maneuver comprises checking whether the cooperative driving maneuver is compatible with the one or more driving intentions of the transportation vehicles in an environment of the transportation vehicle. The method is also designed for providing a driving assistance for executing the cooperative driving maneuver via the interface, provided the cooperative maneuver is compatible with the one or more further driving intention messages of the transportation vehicles in an environment of the transportation vehicle.

Exemplary embodiments also create a transportation vehicle comprising at least one of the devices. In addition, exemplary embodiments create a system comprising a transportation vehicle equipped with a device for initiating a cooperative driving maneuver and further comprising another transportation vehicle equipped with a device for carrying out a cooperative driving maneuver. Exemplary embodiments also create a program with a program code for implementing at least one of the methods when the program code is executed on a computer, a processor, a control module or a programmable hardware component.

Various exemplary embodiments will now be described in more detail with reference to the accompanying drawings, in which several exemplary embodiments are shown. In the figures, the thickness dimensions of lines, layers and/or regions are shown exaggerated for the sake of clarity.

In the following description of the attached figures, which only show some exemplary examples, the same reference numerals can be used to designate identical or equivalent components. In addition, collective reference numerals can be used for components and objects, which occur multiple times in at least one exemplary embodiment or in a drawing, but which are described together in relation to one or more features. Components or objects described with the same or collective reference numerals can be embodied in the same way in terms of individual, multiple or all features, for example, in terms of their dimensions, but may also be embodied differently, unless otherwise explicitly or implicitly given by the description.

Although exemplary embodiments can be modified and amended in different ways, the exemplary embodiments shown in the figures are examples and are described in detail herein. It should, however, be made clear that it is not intended to restrict exemplary embodiments to the disclosed forms, but that instead exemplary embodiments should cover functional and/or structural modifications, equivalents and alternatives which lie within the field of the disclosure. Identical reference numerals designate the same or similar elements throughout the description of the figures.

It is important to note that for any element, which is designated as being "connected" or "coupled" to any other element, it can either be directly connected or coupled to the other element or else intervening elements may be present. If on the other hand, an element is designated as being "directly connected" or "directly coupled" to another element, then there are no intervening elements present. Other terms used to describe the relationship between elements should be interpreted in a similar way (e.g., "between" compared to "directly between", "adjacent" compared to "directly adjacent", etc.).

The terminology used herein is used only for the description of certain exemplary embodiments and is not intended to restrict the exemplary embodiments. As used herein, the singular forms "a" and "an" and "the/this" are also meant to include the plural forms, unless the context clearly indicates otherwise. In addition, it should be clarified that the expressions such as "contains", "containing", "has", "comprises", "comprising" and/or "having" as used herein, indicate the presence of cited features, whole numbers, operations, work processes, elements and/or components, but do not exclude the presence or addition of one more or one or a plurality of features, whole numbers, operations, work processes, elements, components and/or groups thereof.

Unless otherwise defined, all of the terms used herein (including technical and scientific terms) have the same meanings as would be ascribed to them by an average person skilled in the art in the field to which the exemplary embodiments belong. It should also be clarified that expressions, such as those that are defined in commonly used dictionaries, are to be interpreted as if they had the meaning consistent with their meaning in the context of the relevant technology and should not be interpreted in an idealized or overly formal sense, unless this is expressly defined herein.

Cooperative driving designates a behavior in road traffic, in which the road users enable, facilitate or support mutually planned maneuvers by appropriate adaptation of their own driving behavior. For example, cooperation can take place between different types of transportation vehicles (cars, commercial vehicles, motorcycles, etc.). A cooperative maneuver involves two roles: that of the road user who asks for a cooperation/requests a cooperation, such as creating a gap for lane changing/merging, and that of the road user who fulfils the request/accepts the request and, for example, creates a suitable gap.

The idea of at least some exemplary embodiments is to send, in addition to the already standardized V2X messages (Cooperative Awareness Message (CAM, periodic status message of the transportation vehicle), Decentralized Environmental Notification Message (DENM, event-based message), Basic Safety Message (BSM, elementary safety message), Signal Phase and Timing message signal, (SPAT)), explicit intention messages, on the basis of which the cooperative behavior can be implemented. In cooperative maneuvers it is always helpful if the intention of the transportation vehicles is known. Among other things, for the transportation vehicles which are potentially eligible for the Accept role, a driving intention message facilitates the decision as to whether they should respond to the request (relevance assessment), as well as the implementation of the cooperative maneuver itself.

Figure 2:
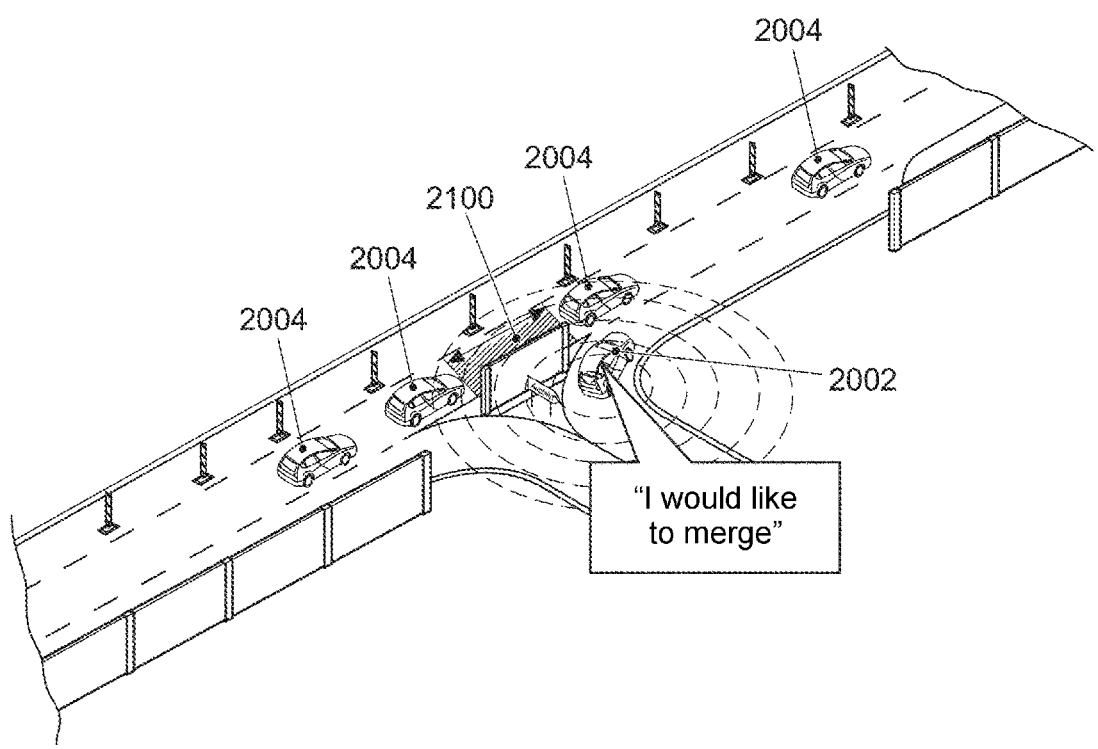
FIG. 2 shows an example of an exemplary embodiment.

As an example, in FIG. 2 a transportation vehicle 2002 is shown, which would intends to enter a freeway and merge into the traffic. To this end, it sends a driving intention message, for example, to the transportation vehicles 2004 in the environment, which message comprises an intention to merge into a traffic gap 2100. The transportation vehicles 2004 in the environment can be designed to receive the driving intention message and to actively or passively enable a cooperative maneuver based on the driving intention message.

Figure 1A:
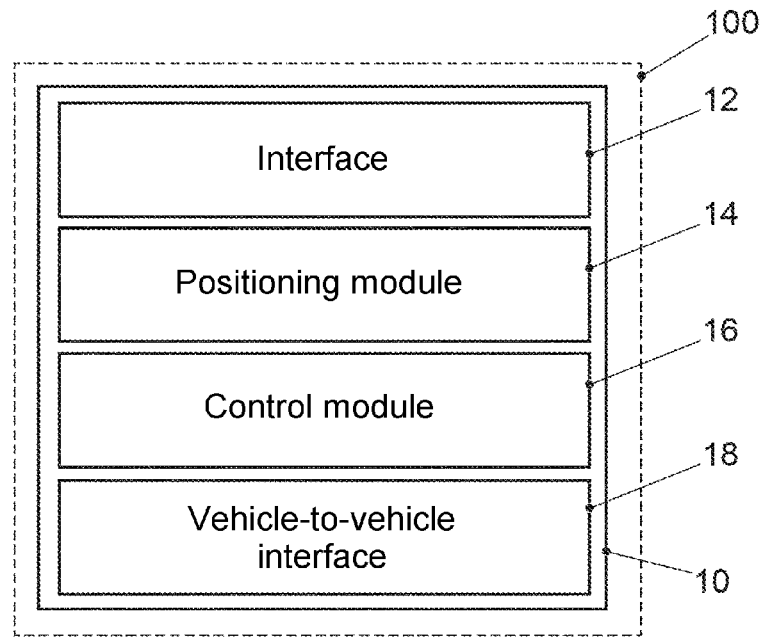
FIG. 1a illustrates a block diagram of an exemplary embodiment of a device for initiating a cooperative driving maneuver.

FIG. 1 illustrates a flow diagram of an exemplary embodiment of a method for initiating a cooperative driving maneuver by providing a driving intention message for transportation vehicles in an environment of a transportation vehicle 100. The driving intention message comprises information about an intention of a driver, or an at least partially automatic transportation vehicle control system, of the transportation vehicle 100 to carry out a driving maneuver. FIG. 1a illustrates a block diagram of an exemplary embodiment of a device 10 which is designed to implement the method.

In some exemplary embodiments, the driving intention message can comprise information on a projected trajectory of the projected driving maneuver, for example, as a time-position specification or as a specification of a target range of the driving intention.

The driving intention can comprise, for example, information about a future intention to merge, a future intention to overtake, or a future intention to turn off on the part of the transportation vehicle 100. Driving intentions can also include, for example, a lane change, a merging, a parking operation, pulling out from a parking space, or an allocation of road area for maneuvering.

For example, the information about the driving intention can comprise information about at least one intention from the set of Single lane change to the left, Single lane change to the right, Double lane change to the left, Double lane change to the right, Triple lane change to the left, Triple lane change to the right, Turning left, Turning right, Pulling out from parking space and Parking the transportation vehicle. The driving intention can accordingly comprise, for example, at least one element from the set of Single lane change to the left, Single lane change to the right, Double lane change to the left, Double lane change to the right, Triple lane change to the left, Triple lane change to the right, Turning left, Turning right, Pulling out from a parking space and Parking the transportation vehicle.

In at least some exemplary embodiments the transportation vehicle 100 could correspond, for example, to an agricultural vehicle, a road vehicle, a car, a motor vehicle or a heavy goods vehicle.

The at least partially automatic transportation vehicle control system can correspond, for example, to a control unit of an automatically driven transportation vehicle, a control unit of a lane change assistant, or a control unit of an adaptive distance-regulating cruise control system.

The method comprises obtaining 110 information about a driving intention. The driving intention is based on the intention to carry out the driving maneuver. The device 10 comprises an interface 12, designed to obtain 110 the information about the driving intention. The interface 12 and an interface 26 of FIG. 3a, can correspond, for example, to one or more inputs and/or one or more outputs for receiving and/or transmitting information, for example, in digital bit values, based on a code, within a module, between modules, or between modules of different entities. For example, the information about the driving intention can comprise a textual or coded representation of the driving intention, for example, as a bit vector, as a bit-code or as one or more coded driving maneuvers. The driving intention can be based, for example, on patterns of driving intentions. For example, can correspond for example, to a representation of the driving maneuver based on a pattern. The information about the driving intention can comprise, for example, a reference to the pattern used and information about parameters of the pattern, for example, a speed, target position, etc. For example, patterns can be used that correspond to the intentions. For example, one or more patterns can be defined for a given intention. For example, the operation of obtaining 110 can be derived from the fact that no traffic gap was identified in an upstream process to implement the driving maneuver.

The method further comprises determining 120 a position of the transportation vehicle 100. The device 10 comprises a positioning module 14, designed to determine the position of the transportation vehicle. In exemplary embodiments, the positioning module 14 can be implemented as any component which allows calculation or determination of information relating to a position of the device or of the positioning module 14. Examples of conceivable components are receivers for satellite-based navigation systems, for example, a GPS receiver (Global Positioning System), or else other components which allow a position determination, for example, via triangulation of received radio signals. The position of the transportation vehicle 100 can comprise, for example, an absolute position of the transportation vehicle 100, for example, as a length and width measurement or as GPS coordinates, or a relative position of the transportation vehicle, for example, relative to coordinates of the digital map.

The method also comprises determining 130 the driving intention message, based on the information about the driving intention. The driving intention message can be based, for example, on a communication protocol, for example, on a communications protocol of a vehicle-to-vehicle communication system. In some exemplary embodiments, the determination 130 of the driving intention message can also be based on the position of the transportation vehicle 100. The driving intention message may also comprise, for example, information about the position of the transportation vehicle 100 and/or information about a driving lane currently being used by the transportation vehicle 100. For example, the driving intention can also be adapted based on the position. For example, the determination 130 of the driving intention message 130 can also assign the driving intention a position, for example, a position relative to the transportation vehicle 100 or an absolute position, at which the driving intention can be implemented, for example, as a driving maneuver.

In an exemplary implementation the driving intention message has a header which can comprise checking or control data, and containers which can comprise content data, with information on the intention (Request Containers and Accept Containers) and a container with information on the maneuver itself (Maneuver Information Container). A driving intention message with a request container can correspond, for example, to the driving intention message from FIG. 1, a driving intention message with an accept container can correspond, for example, to a message about an acceptance of the cooperative driving maneuver from FIG. 1*b*.

The header can a protocol version and a message identification (also Message ID), which can be implemented similarly to that used in CAM, as well as a session identification (or Session ID). The session ID can prevent ambiguities and in a cooperative maneuver can facilitate the relevance filtering and the maneuver planning. It can be retained until no more messages are sent to the maneuver according to the transmission rules valid for the maneuver. A new session ID can be used for a new maneuver.

The session ID can be generated, for example, according to specified rules. These can be defined, for example, such that no identical session ID may be used in the environment of the maneuver (uniqueness requirement), and that the session ID cannot be used for tracking transportation vehicles (privacy requirement), roughly similar to pseudonym certificates. The algorithm used to generate the session ID could contain, for example, the transportation vehicle pseudonym, the start time of the session, a random number and a hash function.

The request container can transfer information about the planned maneuver (the driving intention), for example, as a defined, function-dependent key. The request container can comprise, for example, information about the driving maneuver (a type of the driving maneuver), for example, about a single lane change to the left, a single lane change to the right, a double lane change (cutting across) to the left, a double lane change (cutting across) to the right, a triple lane change (cutting across) to the left, a triple lane change (cutting across) to the right, turning off to the left, turning off to the right, pulling out from a parking space and/or parking. The request container can also comprise information about a current driving lane of the transportation vehicle 100, for example, a number of the driving lane (also a part of CAM and BSM), whether it is an on-ramp/acceleration lane and/or a lay-by/bus stop, a position of the transportation vehicle (also part of CAM) and/or a length of the transportation vehicle, such as the length of a single transportation vehicle or the length of a car/trailer combination.

The Accept container can comprise, for example, information about the acceptance of the cooperative driving maneuver, information on the type of the intended maneuver (such as creating a traffic gap with the required size, change of lane to the left, change of lane to the right), and/or information about an acknowledgment of receipt.

Figure 1B:
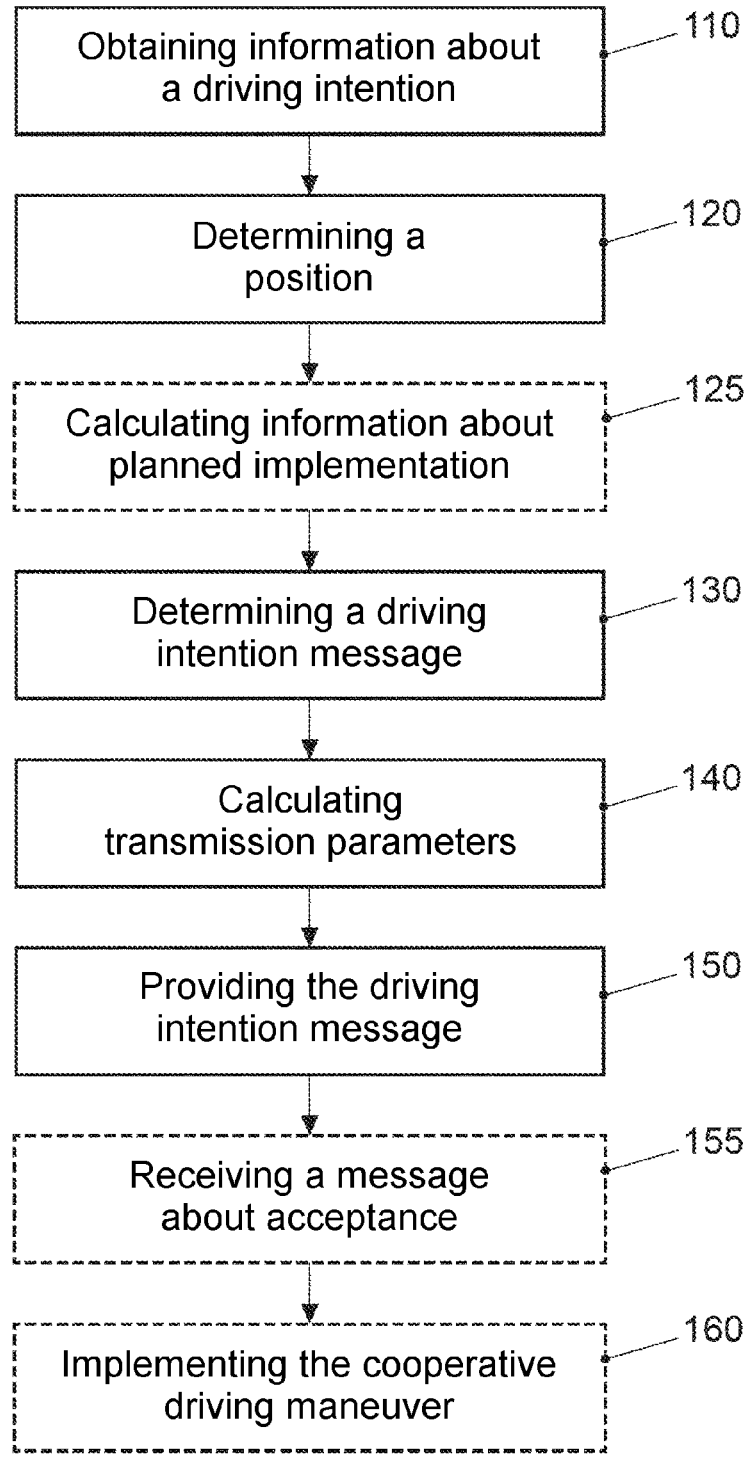
FIG. 1b illustrates a flow diagram of a further exemplary embodiment of a method for initiating a cooperative driving maneuver.

In at least some exemplary embodiments, as shown in FIG. 1*b*, the method can also comprise calculating 125 information about a planned implementation of the driving maneuver, based on the position of the transportation vehicle. For example, the calculation 125 can comprise calculating a first possible, a desired and/or a last possible time for the change of lane, and a prediction of an estimated speed of the transportation vehicle 100 and an estimated change of position of the transportation vehicles in an environment of the transportation vehicle 100. The information about the planned implementation of the driving maneuver can comprise, for example, information about at least one element of the set of first possible lane change point, planned lane change point, last possible lane change point, and phase of the driving maneuver. The driving intention message may also comprise the information about the planned implementation of the driving maneuver. For example, a driving maneuver can comprise one or more phases, for example, at least one element of the set of planning stage, waiting phase, one or more partial driving maneuvers, and a final phase.

The maneuver information container, which can correspond, for example, to a piece of information about a planned implementation of the driving maneuver, can comprise, for example, information on the planned implementation of the maneuver (e.g., planned lane change point (geospatial coordinates of the calculated lane change point and the calculated period until this lane change point)), information about the phases of a maneuver (maneuver progress), and/or boundary conditions of the maneuver, which must be complied with by the transportation vehicle (for example, first possible lane change point (geospatial coordinates of the first possible lane change point and period until this lane change point). "First possible" here means: the earliest lane change point due to the structural circumstances), and, for example, information about a termination of a driving maneuver.

In accordance with its role in a cooperative driving maneuver, a transportation vehicle can send the request or accept container. The driving intention message can be sent, for example, as a separate message or else integrated in the status message (CAM or BSM), where a part of the information is already included (e.g., transportation vehicle length, driving lane, turn signal status).

The method also comprises calculating 140 transmission parameters for the driving intention message. The transmission parameters comprise a repetition rate and a time of transmission. The calculation 140 of the transmission parameters can be based, for example, on a desired reception probability of the driving intention message, the driving intention and the position of the transportation vehicle. For example, the calculation 140 can comprise obtaining information about location-dependent transmission parameters. The information about the location-dependent transmission parameters can be based, for example, on at least one element of the set of signal strength, received signal strength, error rate, transmission probability, reception probability, information about an influence of a route guidance system on the direct vehicle-to-vehicle communication, information about static and/or mobile obstacles for a direct vehicle-to-vehicle communication between different points on a section of road and/or comprise at least one element of the set. In at least some exemplary embodiments, the information about the location-dependent transmission parameters can comprise one or more sets/groups of transmission parameters, for example, settings for transmit/receive units, related for example, to the transmission gain or a predistortion, and/or settings at the protocol level, which indicate a repetition rate, for example. Alternatively or additionally, the information about the location-dependent transmission parameters can comprise measurement results of received signals or data that are based on one or a plurality of sets of sending parameters. Based on the information about the location-dependent transmission parameters, the calculation 140 can determine transmission parameters for the current position of the transportation vehicle.

For example, the calculation 140 of the transmission parameters can be based on the driving intention: for example, different driving intentions can require different transmission parameters. For example, the calculation 140 can be based on the direction in which, for a particular driving intention, transportation vehicles can be located in the environment for which the driving intention is relevant, for example, if the transportation vehicle 100 is designed (for example, by the vehicle-to-vehicle interface 18) to provide the driving intention message to a specific target.

For example, the calculation 140 can compute the repetition rate for the transmission parameters. For the repetition rate of the intention message, for example
1. a fixed value can be specified (such as in BSM) or
2. the transmission rate can be adjusted dynamically (such as in CAM). In the case of dynamic adjustment either of these is possible:
    a. it is performed based on the CAM standard or
    b. separate rules are used for sending an intention message.

In at least one disclosed design, the repetition rate of the intention messages can be dynamically specified by the calculation 140 such that at a specified distance a minimum reception probability, to be defined, of the intention messages is reached. With increasing repetition rate the reception probability usually increases, since it is a cumulative reception probability.

The distance to be defined can be selected, for example, such that the potentially cooperating road users receive intention messages sufficiently early that a relevance assessment and the implementation of the cooperative maneuver is possible. Therefore, the distance associated with a reception probability (e.g., 99%) to be defined depends on the type of intention (e.g., merging, parking), on the cooperative maneuver (lane change, deceleration), on the traffic situation (e.g., inner-city 30 mph zone, highway without speed restriction), on the traffic density, among others. The calculation 140 of the transmission parameters can be based, for example, on at least one element of the set of type of intention, type of cooperative maneuver, traffic situation and traffic density.

The probability that intention messages sent by the transportation vehicle 100 (and other types of messages) are received at a specific distance from other road users often depends on the location (shading by buildings, hills, forest, etc.). It can be estimated, for example, from an observation of the radio channel or be based on location-dependent transmission parameters. For example, the reception probability can be determined by measurement techniques and be available from a digital map, for example, contained in the information about the location-dependent transmission parameters.

In a further disclosed design, the repetition rate of the intention messages is dynamically adjusted to the procedure of the cooperation maneuver. If two cooperation partners have met for a cooperative maneuver and a request driving intention message has been provided 150 (FIG. 1), and a message about an acceptance of the cooperative driving maneuver has been received 155 (FIG. 1b) (Accept driving intention message), the repetition rate of the intention messages can be reduced, for example, if the cooperation partners are located close together in space. For example, on a highway on-ramp, if the cooperation partners are still far apart from each other the repetition rate can be higher. If the merging operation takes place and one of the cooperation partners is driving almost right behind the other, the repetition rate can be lower. The reduction of the repetition rate can take place, for example, in a location-dependent or distance-dependent way according to a specified algorithm, which in at least one exemplary embodiment takes the distance and the relative speeds of the cooperation partners as inputs, e.g., linear reduction of the repetition rate from the start value to a value to be defined (e.g., 2 Hz).

A period of validity of a driving intention message can end, for example, on receipt of a further driving intention message with the same session ID, or if no further message is received after a specified lifetime (the value can depend on the transmission rate, for example).

The method also comprises providing 150 the driving intention message as a direct vehicle-to-vehicle message for the transportation vehicles in the environment of the transportation vehicle 100 based on the transmission parameters.

The device 10 comprises a control module 16, which is designed for controlling the interface 12, the positioning module 14 and a vehicle-to-vehicle interface 18. The control module 16 is designed to determine 130 the driving intention message based on the information about the driving intention, to calculate 140 the transmission parameters and to provide 150 the driving intention message via the vehicle-to-vehicle interface 18. The control module 16 is coupled to the interface 12, the positioning module 14 and the vehicle-to-vehicle interface 18. In at least some exemplary embodiments the control module 16 can be designed to implement the process operations at 110-160, for example, using the interface 12, the positioning module 14 and/or the vehicle-to-vehicle interface 18.

Figure 3:
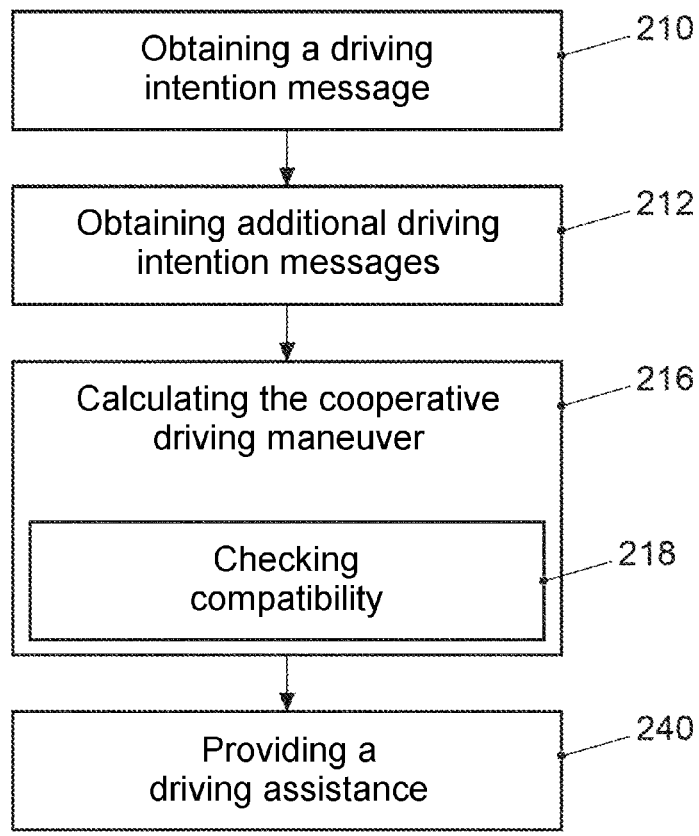
FIG. 3 illustrates a flow diagram of an exemplary embodiment of a method for a transportation vehicle for carrying out a cooperative driving maneuver.
Figure 3A:
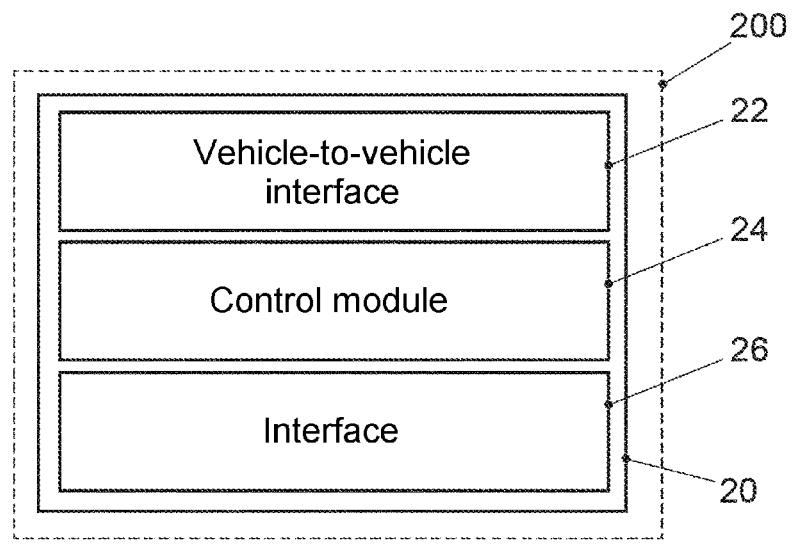
FIG. 3a illustrates a block diagram of an exemplary embodiment of a device for a transportation vehicle for carrying out a cooperative driving maneuver.

In exemplary embodiments, the control device or control module 16, and a control module 24 from FIG. 3a, can correspond to any controller or processor or a programmable hardware component. For example, the control module 16; 24 can also be implemented as software which is programmed for a corresponding hardware component. In this respect, the control module 16; 24 can be implemented as programmable hardware with appropriately adapted software. Any type of processors, such as digital signal processors (DSPs), can be used for this. Exemplary embodiments are not restricted to a specific type of processor. Any number of processors or even a plurality of processors is conceivable for the implementation of the control module 16; 24.

A direct vehicle-to-vehicle communication for providing 150 the driving intention message can be carried out, for example, via a vehicle-to-vehicle interface, such as the vehicle-to-vehicle interface 18 of the device 10. The provision 150 of the driving intention message can take place, for example, via a shared communication channel (shared channel, broadcast channel). In some exemplary embodiments, the provision 150 can be carried out via a direct vehicle-to-vehicle communication by a direct wireless communication link between two transportation vehicles, for example, without the use of a base station, for example, in accordance with IEEE 802.11p (a standard of the Institute of Electrical and Electronics Engineers). The vehicle-to-vehicle interface 18 and a vehicle-to-vehicle interface 22 from FIG. 3a can be designed, for example, to communicate directly with other transportation vehicles in an environment by wireless. The vehicle-to-vehicle interface 18;22 can be designed, for example, for a direct vehicle-to-vehicle communication and comprise one or more inputs and/or one or more outputs for receiving and/or transmitting information, for instance, in digital bit values, between different transportation vehicles. Alternatively or additionally, the vehicle-to-vehicle interface 18; 22 can be designed to use a transportation vehicle light, for example, a transportation vehicle light directed in the direction of travel or in the direction opposite to the direction of travel (front headlights, daytime running lights for traffic driving ahead and tail lights for following traffic), to provide a vehicle-to-vehicle communication using information modulated on to the light beam. Camera systems in the front/rear section or appropriate light sensors are conceivable as receivers.

The provision 150 can be, for example, the beginning of the exemplary communication protocol described in the following.

A request driving intention message can correspond to the driving intention message of FIG. 1 and/or FIG. 3. If corresponding trigger conditions are met, the transportation vehicle which requests a cooperation, such as a requesting transportation vehicle 100 from FIG. 1 or 3, can send a request driving intention message with a filled request container and driving maneuver container (optional) and with an empty accept container. The driving intention message can be sent, for example, 1. up to the completion of the cooperative driving maneuver or
2. if no maneuver is implemented, until a cooperation is no longer relevant, for example, because in the meantime the intended maneuver can be carried out without cooperation partners.

In some exemplary embodiments, as shown in FIG. 1*b*, the method can also comprise receiving 155 a message about an acceptance of the cooperative driving maneuver as a response to the driving intention message, from at least one of the transportation vehicles in the environment of the transportation vehicle, for example, by the control module 16 via the vehicle-to-vehicle interface 18. The message about the acceptance of the cooperative driving maneuver can indicate, for example, that at least one transportation vehicle is ready to carry out the cooperative driving maneuver. The calculation 140 of the transmission parameters can also be based on the message about the acceptance of the cooperative driving maneuver. For example, the transmission parameters can be based on a position or an identification of a transportation vehicle which provided the message about the acceptance. For example, the method can also comprise determining a distance of the at least one transportation vehicle or its position, and these can be used to adjust a repetition rate, a transmission power or a transmission direction using the transmission parameters.

It can be useful in some cases to carry out a direct consultation of the cooperation partners to validate the driving maneuver. In this case, a possible response of the transportation vehicle 100 to the message about the acceptance of the cooperative driving maneuver of the cooperating transportation vehicle can be a confirmation (or Acknowledge) message. The control module 16 can be designed to send, in addition to the request container, an accept container with the acknowledgment message. This can be carried out, for example, as long as request containers are being sent.

It is conceivable that situations will occur which require the planned cooperative maneuver to be aborted, for example, transportation vehicles in front of the accept transportation vehicle force it to brake so it cannot generate the planned gap. In this case, the accept transportation vehicle can be configured to suspend the sending of a message about acceptance of the cooperative driving maneuver, or to provide messages with an empty accept container and the abort information in the maneuver information container. The abort intention message can be sent, for example, with a fixed number of repetitions (e.g., 5 times). In some exemplary embodiments, no further messages are then sent by the accept transportation vehicle about acceptance of the cooperative driving maneuver.

In the event that the transportation vehicle 100 no longer wishes to or cannot carry out the planned co-operative maneuver, the control module 16 can be designed, for example, to suspend the provision of driving intention messages or to provide a maneuver abort message with the specified number of repetitions.

In at least some exemplary embodiments, the method can also comprise implementation 160 of the cooperative driving maneuver, for example, based on the driving intention message and based on the message about the acceptance of the cooperative driving maneuver. The implementation 160 can comprise, for example, at least one element of the set of providing a speed-time curve for an adaptive cruise control system, providing a longitudinal and/or transverse control assistance, triggering an automated lane change, and providing parameters for an at least partially automatic driving control system.

The implementation 160 can also comprise providing a control signal for controlling the braking, acceleration or lane change functionalities, for example, via an interface, such as a Controller Area Network Bus (CAN bus) of the transportation vehicle 100.

The implementation 160 can correspond, for example, to an automated execution of the driving maneuver, for example, via a driver assistance system or by adaptation of an automatically driven transportation vehicle. Alternatively or additionally, the implementation 160 can correspond to provision of instructions for implementing the driving maneuver for a driver of the transportation vehicle 100 via a human-machine interface. The human-machine-interface can be, for example, a screen, a projector or an audio output module. The instructions can be, for example, spoken instructions, audio signals and/or visual representation of the instructions.

In some exemplary embodiments, the implementation 160 can also comprise a longitudinal control and/or a transverse control, based on the driving intention messages and status messages, of the at least one other transportation vehicle, environment information of the at least one other transportation vehicle and/or sensor data of the transportation vehicle 100.

FIG. 3 illustrates a flow diagram of an exemplary embodiment of a method for a transportation vehicle 200 for implementing a cooperative driving maneuver. FIG. 3*a* illustrates a block diagram of an exemplary embodiment of a device 20 for the transportation vehicle 200 for implementing a cooperative driving maneuver, designed for executing the method.

The method comprises obtaining 210 a driving intention message from a requesting transportation vehicle 100. The driving intention message comprises information about an intention of a driver, or an at least partially automatic transportation vehicle control system, of the transportation vehicle 100 to implement a driving maneuver. The reception 210 can be performed, for example, by vehicle-to-vehicle communication, for example, via a vehicle-to-vehicle interface 22 of the device 20, which is designed for vehicle-to-vehicle communication. The device also comprises a control module 24, designed for receiving 210 via the vehicle-to-vehicle interface 22. The vehicle-to-vehicle interface 22 is coupled to the control module 24. The device also comprises an interface 26 which is coupled to the control module 24.

The method also comprises receiving 212 one or more additional driving intention messages of transportation vehicles in an environment of the transportation vehicle 200. The one or more further driving intention messages comprise information about one or more driving intentions of the transportation vehicles in an environment of the transportation vehicle 200. The driving intention messages can be implemented, for example, similarly to the driving intention message of the requesting transportation vehicle 100. The control module 24 is designed for receiving 212 via the vehicle-to-vehicle interface 22.

The method also comprises calculation 216 of the cooperative driving maneuver, based on the driving intention message of the requesting transportation vehicle 100 and on the one or more further driving intention messages of the transportation vehicles in an environment of the transportation vehicle 200. The control module 24 is designed for calculating 16. The calculation 216 comprises checking 218 whether the cooperative driving maneuver is compatible with the one or more driving intentions of the transportation vehicles in an environment of the transportation vehicle 200. For example, the calculation 218 can check whether a possible lane change point is compatible with the one or more driving intentions, which in some exemplary embodiments can already be carried out. For example, this may be based on a piece of information about the progress of the driving maneuver (phase). In some exemplary embodiments, the checking operation at 218 can also be based on sensor data of the transportation vehicle 200. The checking operation at 218 may also comprise capturing a traffic situation, based on the sensor data. The checking operation at 218 can also verify whether the planned driving maneuver is compatible with the traffic situation. The sensor data can comprise, for example, camera sensor data, radar sensor data, lidar sensor data or propagation time sensor data.

In some exemplary embodiments the calculation 216 can comprise, for example, determining 220 a piece of information about a cooperation in a cooperative driving maneuver with the requesting transportation vehicle 100. The information about the cooperation can indicate whether the transportation vehicle 200 is eligible as a cooperation partner and whether a cooperative behavior is possible given the traffic situation, based on the driving intention message. In some exemplary embodiments it may also be checked/displayed whether the cooperative behavior is possible based on further restrictions.

The determination operation at 220 as a relevance assessment can check, for example, in a plurality of operations, whether the receiving transportation vehicle is eligible in principle as a cooperation partner and whether a cooperative behavior is possible, taking into account the traffic situation as well as possible further restrictions. These restrictions result, for example, from the limits of the driver's readiness to co-operate and from other goals, such as an efficient driving. For example, the determination operation at 220 can be based on information about a driving behavior of a driver of the transportation vehicle 200. The method can also comprise determining the information about the driving behavior, for example, to determine a driving dynamics or a probability of overtaking for the driver.

For example, the driver could specify the maximum permissible deceleration when increasing the size of gaps using the information about the driving behavior. This could derive the determination of the driving dynamics from its driver's experience, according to the facility of an ACC to configure the distance to the transportation vehicle in front within certain limits. It could also be determined whether driving lane changes are allowed to be considered for a cooperative maneuver or not.

In some exemplary embodiments, for example, the calculation 216 can also comprise determining 230 information about a driving maneuver for planning a maneuver. The information about the driving maneuver can comprise, for example, a trajectory of a driving maneuver, for example, as a time-position chain. In at least some exemplary embodiments the maneuver planning also takes place in several operations. The determination operation at 230 can comprise, for example, determination 232 of information about at least one distance to a transportation vehicle in front and/or to a following transportation vehicle, to enable a calculation of whether the desire to change lanes can be met in a possible cooperation area. The determination operation can calculate, for example, the extent to which the distance to its leading transportation vehicle and, if appropriate, also to its following transportation vehicle, can be adjusted for a lane change maneuver at the current driving speed. If the length of the request transportation vehicle (and any trailer, etc.) is transmitted, for example, in the driving intention message or by status messages of the request transportation vehicle, in some exemplary embodiments this can be taken into account.

In some exemplary embodiments the determination operation at 230 also comprises an identification 234 of an execution of the driving maneuver, based on the information about the driving maneuver, the information about the at least one distance, a speed of the transportation vehicle 205 and a distance to the possible cooperation area. On the basis of the result of the previous operations, taking into account its speed and the distance to the possible cooperation area, the identification operation at 234 can identify which implementation of the driving maneuver (e.g., delay-time curve) would be necessary for the cooperation.

In some exemplary embodiments the determination operation at 230 also comprises calculating 236 whether the driving maneuver is possible, taking into account the traffic situation (and, for example, further restrictions). In the event of a negative test outcome, the maneuver planning may be aborted.

The method further comprises providing 240 a driving assistance for implementing the cooperative driving maneuver via the interface 26, provided the cooperative maneuver is compatible with the one or more further driving intention messages of the transportation vehicles in an environment of the transportation vehicle 200.

The provision 240 of the driving assistance can correspond, for example, to an automated execution of the driving maneuver, for example, via a driver assistance system or by adjustment of an automatically driven transportation vehicle. Alternatively or additionally, the provision 240 can correspond to a provision of instructions for implementing the driving maneuver for a driver of the transportation vehicle 240 via a human-machine interface. The human-machine-interface can be, for example, a screen, a projector or an audio output module. The device 20 can comprise, for example, the human-machine interface. The instructions can be, for example, spoken instructions, audio signals and/or visual representation of the instructions.

In some exemplary embodiments, the provision operation at 240 can also comprise a longitudinal control and/or a transverse control, based on the driving intention messages and status messages of the at least one other transportation vehicle, environment information of the at least one other transportation vehicle and/or sensor data of the transportation vehicle 200.

Depending on the degree of automation, the transportation vehicle 200 can perform the planned maneuver automatically, the provision 240 can also inform the driver via a suitable HMI, or in the case of manual operation of the transportation vehicle it can prompt the driver to implement the cooperative maneuver. In addition, it can provide 240 appropriate instructions via a corresponding HMI.

The provision 240 may also comprise providing a message about an acceptance of the lane change request for the requesting transportation vehicle 100 and the at least one other transportation vehicle 200 (Accept message).

Transportation vehicles which receive request intention messages can carry out, for example, a relevance assessment, for instance, by obtaining 220 information about cooperation in a cooperative driving maneuver. An example of an item to be assessed is whether they qualify as potential cooperation partners. Example criteria are whether they are located on the driving lane concerned, whether cooperative maneuvers are possible for them at all, etc. In the event of a negative relevance assessment the received request message may be discarded and further request messages with this session ID ignored. In some cases, no response is then made to the request (no answer).

Figure 3B:
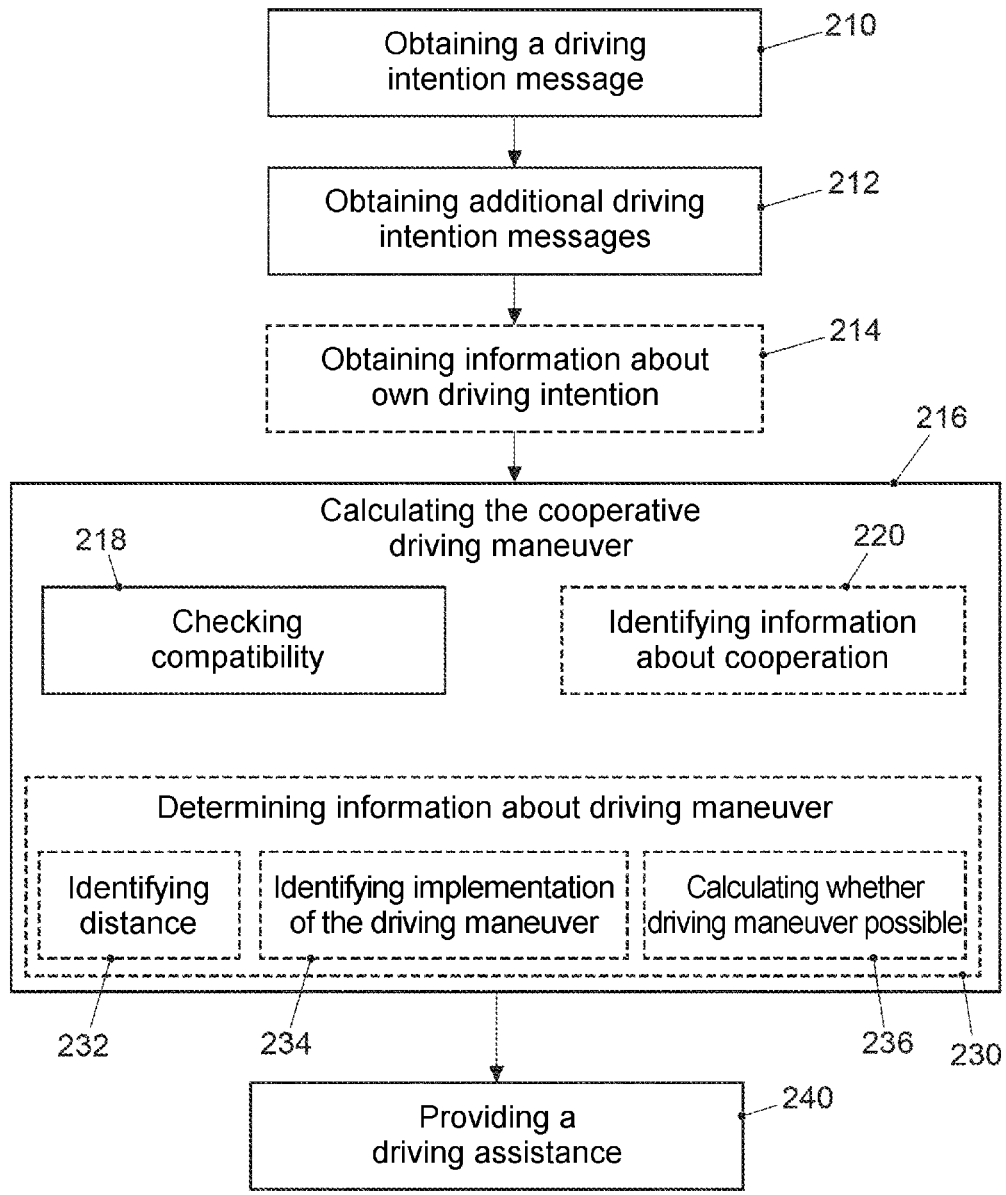
FIG. 3b illustrates a flow diagram of a further exemplary embodiment of a method for a transportation vehicle for carrying out a cooperative driving maneuver.

In the event of a positive relevance assessment a feasibility assessment can be carried out, for instance, by determining (230) information about a driving maneuver (FIG. 3*b*). In some exemplary embodiments, it can be verified that
1. no other transportation vehicle is already sending an Accept intention message with this session ID (uniqueness of the cooperation partners involved) and
2. no conflicts occur with other cooperative maneuvers already planned (with a different session ID). This requires, among other things, an analysis of the spatial arrangement of the various cooperation pairs relative to each other and a check of whether the "choreography" of the cooperation processes is possible without a collision.

In the case of a positive feasibility assessment an intention message with Accept container can be sent, which can comprise the Accept and the type of the proposed maneuver (create gap with the required size, change of lane). The Accept intention message in some exemplary embodiments is sent
1. up to the completion of the cooperative maneuver or
2. until the cooperative maneuver is aborted For reasons of uniqueness, in some exemplary embodiments only one cooperative maneuver can be processed by a transportation vehicle. The control module 24 can be designed, for example, not to send Accept intention messages relating to more than one session at the same time.

In some exemplary embodiments, as shown in FIG. 3*b*, the method can also comprise obtaining 214 information about the transportation vehicle's 200 own driving intention. This can be implemented, for example, in a similar way to the obtaining operation at 110. The calculation 216 can also be based on the information about the transportation vehicle's own driving intention, for example, the transportation vehicle's own driving intention can be used analogously to the one or more other driving intentions. Alternatively or in addition to checking the compatibility of the driving intentions of the driving intention message and the additional driving intention messages, the checking operation at 218 can check whether the cooperative maneuver is compatible with the transportation vehicle's own driving intention. The provision 240 can also be based on whether the cooperative driving maneuver is compatible with the transportation vehicle's own driving intention.

In at least one exemplary embodiment the driving maneuver can be a Single lane change maneuver to the left. If the transportation vehicle's 200 own intention comprises a driving lane change to the left, then the calculation operation at 216 can calculate the cooperative maneuver in such a way that the cooperative driving maneuver comprises a double lane change of the transportation vehicle (200) to the left, for example, to enable the single lane change to the left of the requesting transportation vehicle 100.

Figure 4A:
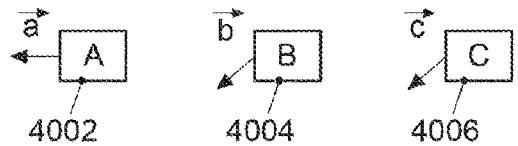
FIGS. 4a-4c show an example of an exemplary embodiment of a method for carrying out a cooperative driving maneuver.

FIG. 4*a* shows an overview of the exemplary embodiment. Three Vehicles A 4002, B 4004, C 4006 are driving one behind the other. The velocities behave as follows: Va<Vb<Vc. Both B 4004 and C 4006 are planning an overtaking maneuver. This situation often occurs, for example, on freeways if a transportation vehicle B 4004 with a trailer overtakes a truck A 4002 and in doing so must take into account the faster, following traffic C 4006.

It would be beneficial if C 4006 had knowledge of the overtaking intention and is prepared to move out of the way, for example, onto a third lane. In addition, it would be beneficial if C 4006 could have knowledge of the planned overtaking maneuver in good time, to react accordingly. In the ideal case, the overtaking maneuver of B 4004 and C 4006 could be automatically synchronized and implemented.

Figure 4B:
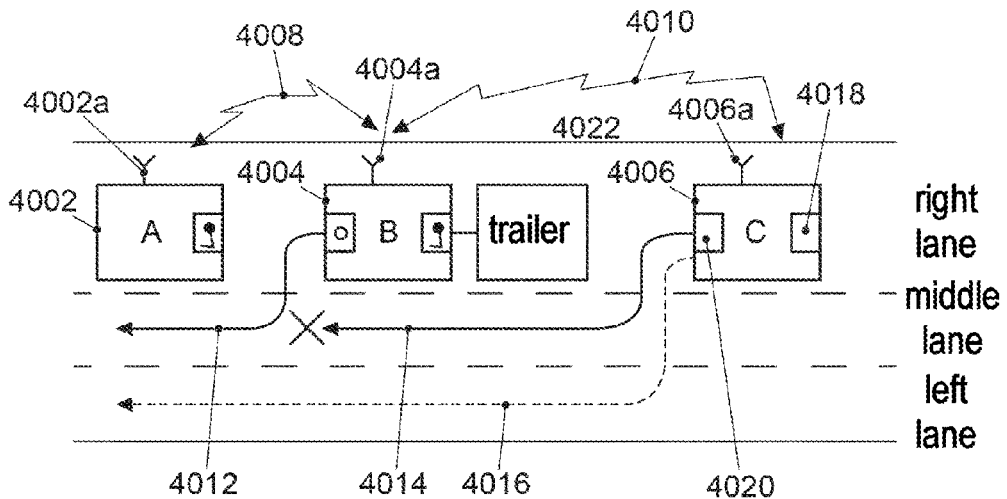

FIG. 4*b* shows another overview of the system. A 4002, B 4004 and C 4006 are transportation vehicles with different speeds, 4002*a*, 4004*a* and 4006*a* are antennas of a car-2-car communication system, 4008 and 4010 communication paths between the transportation vehicles, 4012 is a planned path of the overtaking operation of B, 4014 is a planned path of the overtaking operation of C, which could lead to a collision with B, 4016 is a path of the overtaking operation of C, with knowledge of the overtaking intention of B, and 4018 is a rear-facing sensor device. This can comprise, for example, a camera, a light sensor, a radar system, a LIDAR system, or an ultrasonic sensor. 4020 shows a frontal sensor device. This can comprise, for example, a camera, a light sensor, a radar system, a LIDAR system or an ultrasonic sensor. 4022 shows a communication path in which a transportation vehicle communicates the fact a transportation vehicle is speeding ahead of it. The transportation vehicle in question is additionally provided with a processing unit for evaluating the sensor devices (for example, the control module 16 or 22) and the communication data, and an HMI interface for interaction with the driver. The HMI allows the driver, for example, to signal an overtaking request and to receive a feedback message as to whether the following traffic will allow the overtaking maneuver. The detection of an overtaking request as a driving intention can in some exemplary embodiments be based on the detection of typical preparatory actions, such as head/eye movements in the direction of door or rear-view mirrors, downshifting, tailgating, accelerating, setting the turn indicator, etc.

In one exemplary implementation the transportation vehicle can be designed, for instance, in the determining operation at 220, to create an environment model on the basis of the available data from different sources (vehicle-to-vehicle communication, online data, GPS, camera data, LIDAR data, propagation time sensors). The data can originate from the following sources, for example:
online data about traffic density, position of other transportation vehicles
position of the transportation vehicle from vehicle-to-vehicle messages, status and driving vectors of transportation vehicles in the vicinity
GPS own position
Front radar distance/driving vector of preceding transportation vehicles
Front camera distance and number plate (identification) of preceding transportation vehicles
rear radar distance/driving vector of following transportation vehicles.
rear camera distance and number plate (identification) of following transportation vehicles LIDAR laser scanner, radar vehicle-to-vehicle 802.11p tracking of transportation vehicles via their vehicle-to-vehicle 802.11p signal (radio tracking)

Course data

Corresponding driving intention messages can comprise the following data, for example:

transportation vehicle identification position driving vector/trajectory change of driving vector number of preceding transportation vehicles distance to preceding transportation vehicles presence of traffic gaps in chain of preceding transportation vehicles maneuvering intention acknowledgement A driving vector/trajectory in this context can comprise, for example, a direction, a speed and/or a change of direction/speed. For example, a driving vector can be defined for the planned maneuver, for example, for a desired change in the driving vector.

In the overtaking example with the transportation vehicles A 4002, B 4004, C 4006, for example, the following environmental image is obtained with pre-calculated drive vectors. Both B 4004 and C 4006 are planning an overtaking maneuver.

Figure 4C:
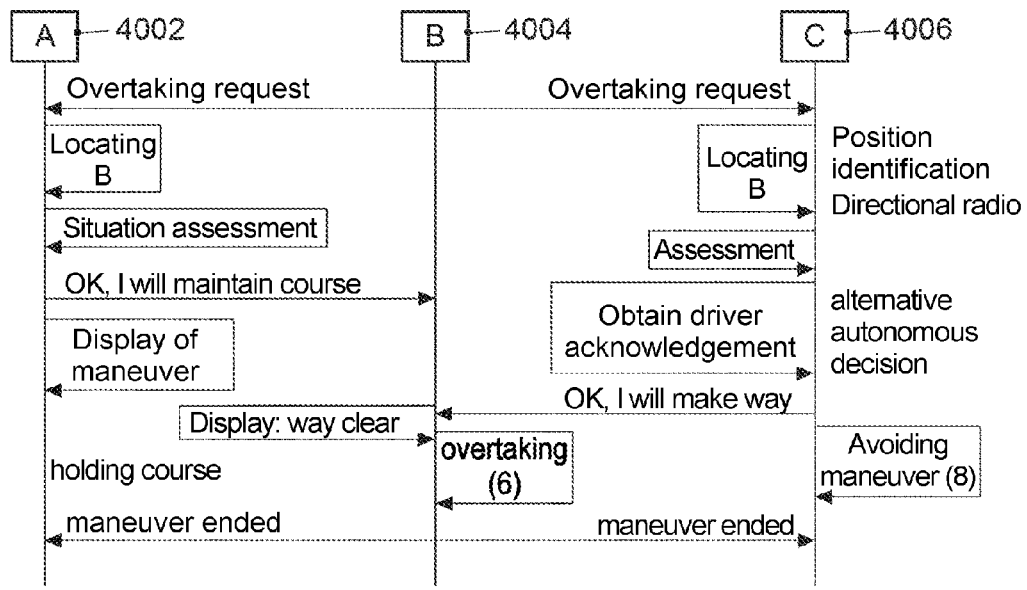

To avoid a collision, the following vehicle-to-vehicle communication shown in FIG. 4c takes place between transportation vehicles, for example:

- B 4004 provides a driving intention message with an overtaking request (single lane change) for the transportation vehicles in the environment A 4002 and C 4006
- A 4002 and C 4006 locate B 4004, for example, via a position which is included in the driving intention message, its identification, or by directional radio
- A 4002 and C 4006 carry out a situation assessment with a relevance assessment (e.g., by identification 220)
- Vehicle A 4002 signals to B 4004 that it is maintaining its course and indicates a corresponding notification to the driver
- Vehicle C 4006 obtains an acknowledgment by the driver (or makes the decision autonomously) and provides a message about acceptance to B, which indicates to B 4004, that C 4006 will execute a double lane change and make way
- Vehicle B 4004 signals to the driver (or an automatic transportation vehicle control system) that the way is free and overtakes
- Vehicle B 4004 signals to A 4002 and C 4006 that the process is completed The upshot is that A 4002, B 4004, C 4006 have agreed on a joint procedure. A 4002 maintains its driving vector. B 4004 overtakes A 4002 and has coordinated this with C 4006. C 4006 overtakes also, but in doing so takes B 4004 into consideration. B4.

In at least some exemplary embodiments the control module 24 can be designed to execute the process operations at 210-240.

Another exemplary embodiment is a computer program for implementing at least one of the methods described above, when the computer program is executed on a computer, a processor or a programmable hardware component. Another exemplary embodiment is also a digital storage medium, which is machine- or computer-readable, and has electronically readable control signals, which can interact with a programmable hardware component such that one of the methods described above is executed.

The features disclosed can be of significance and implemented both individually as well as in any desired combination to realize exemplary embodiments in their various configurations.

Although some properties have been described in connection with a device, it goes without saying that these properties also represent a description of the corresponding method, so that a block or a component of a device is also to be understood as a corresponding method operation or as a feature of a method operation. Similarly, properties that have been described in relation to or as a method operation also represent a description of a corresponding block or detail or feature of a corresponding device.

Depending on the specific implementation requirements, exemplary embodiments can be implemented either in hardware or in software. The implementation can be carried out by using a digital storage medium, such as a floppy disk, a DVD, a Blu-Ray disc, a CD, a ROM, a PROM, or an EPROM, EEPROM or Flash memory, a hard disk or other magnetic or optical storage, on which electronically readable control signals are stored, which can interact with a programmable hardware component, or interact in such a way that the respective method is carried out.

A programmable hardware component can be formed by a processor, a computer processor (CPU=Central Processing Unit), a graphics processing unit (GPU=Graphics Processing Unit), a computer, a computer system, an application-specific integrated circuit (ASIC), an integrated circuit (IC), a single-chip system (SOC=System-on-Chip), a programmable logic element or a field-programmable gate array (FPGA) with a microprocessor.

The digital storage medium can therefore be machine- or computer-readable. Some exemplary embodiments thus comprise a data carrier, which has electronically readable control signals that are capable of interacting with a programmable computer system or a programmable hardware component, in such a way that one of the methods described herein is carried out. At least one exemplary embodiment therefore is a data carrier (or a digital storage medium or a computer-readable medium), on which the program is recorded for carrying out one of the methods described herein.

In general, exemplary embodiments can be implemented as software, firmware, computer program or computer program product with a program code or as data, wherein the program code is, or the data are, effective in terms of carrying out one of the methods if the program is running on a processor or a programmable hardware component. The program code or the data can also be stored, for example, on a machine-readable medium or data carrier. The program code or the data can exist as source code, machine code or byte code, among other things, as well as other intermediate code.

Another exemplary embodiment is also a data stream, a signal train or a sequence of signals, which represent or represents the program for carrying out one of the methods described herein. The data stream, the signal train or the sequence of signals can be configured, for example, so as to be transferred over a data communication connection, for example, via the internet or any other network. Exemplary embodiments are thus also signal trains representing data, which are suitable for transferring over a network or a data communication connection, wherein the data represent the program.

A program in accordance with at least one exemplary embodiment can implement one of the methods during its implementation, for example, by the program reading out memory locations or writing a datum or plurality of data into these locations, which enables switching operations or other operations to be invoked in transistor structures, in amplifier structures or in other electrical, optical, magnetic components or components operating according to another functional principle. Accordingly, by reading from a memory location, data, values, sensor values or other information can be recorded, determined or measured by a program. By reading out one or more memory locations, a program can therefore detect, determine or measure variables, values, measurement variables and other information, and can also by writing to one or more memory locations perform, initiate or implement an action, and also control other equipment, machinery and components.

The examples described above only represent an illustration of the principles of the present disclosure. It is implicit that modifications and variations of the arrangements and details described herein will be apparent other persons skilled in the art. It is therefore intended that the disclosure be limited only by the scope of protection of the following patent claims and not by the specific details, which have been presented herein on the basis of the description and explanation of the exemplary embodiments.

LIST OF REFERENCE NUMERALS 10 device
12 interface
14 positioning module
16 control module
18 vehicle-to-vehicle interface
20 device
22 vehicle-to-vehicle interface
24 control module
26 interface
100 transportation vehicle
110 obtaining information about a driving intention
120 determining a position
125 calculating information about planned implementation
130 determining the driving intention message
140 calculating transmission parameters
150 providing the driving intention message
155 receiving message about acceptance of the cooperative driving maneuver
160 implementing the cooperative driving maneuver
200 transportation vehicle
210 obtaining a driving intention message
212 obtaining one or more other driving intention messages
214 obtaining information about own driving intention
216 calculating a cooperative driving maneuver
218 compatibility checking
220 identifying information about cooperation
230 determining information about driving maneuver
232 identifying distance
234 identifying an implementation of the driving maneuver
236 calculating whether driving maneuver possible
240 providing a driving assistance
2002 transportation vehicle
2004 transportation vehicles in the environment of the transportation vehicle
2100 traffic gap
4002 vehicle A
4002a antenna of vehicle A
4004 vehicle B
4004a antenna of vehicle B
4006 vehicle C
4006a antenna of vehicle C
4008 communication path between vehicle A and B
4010 communication path between vehicle B and C
4012 planned path of B
4014 planned path of C
4016 corrected path of C
4018 rear-facing sensor device
4020 frontal sensor device
4022 communication path

The invention claimed is:

1. A method for initiating and/or carrying out a cooperative driving maneuver by providing a driving intention message for transportation vehicles in an environment of a transportation vehicle, wherein the driving intention message comprises information about an intention of a driver or of an at least partially automatic transportation vehicle control system of the transportation vehicle to carry out a driving maneuver, the method comprising:
obtaining information about a driving intention, wherein the driving intention is based on the intention to carry out the driving maneuver;
determining a position of the transportation vehicle;
determining the driving intention message, based on the information about the driving intention;
calculating transmission parameters for the driving intention message, wherein the transmission parameters comprise a repetition rate and a time of transmission, based on a desired minimum reception probability of the driving intention message, the driving intention and the position of the transportation vehicle;
calculating information about a planned implementation of the driving maneuver based on the position of the transportation vehicle,
wherein the information about the planned implementation of the driving maneuver comprises information about at least one element of the set of first possible planned lane change point, last possible lane change point, and phase of the driving maneuver;
providing the driving intention message as a direct vehicle-to-vehicle message for the transportation vehicles in the environment of the transportation vehicle based on the transmission parameters; and
receiving a message, as a vehicle-to-vehicle message, about an acceptance of the cooperative driving maneuver in response to the driving intention message, from at least one of the transportation vehicles in the environment of the transportation vehicle, the acceptance message including an acceptance and information about an intended type of maneuver of the at least one of the transportation vehicles in the environment,
wherein the calculation of the transmission parameters is additionally based on the message about the acceptance of the cooperative driving maneuver.

2. The method of claim 1, further comprising:
implementing the cooperative driving maneuver, based on the driving intention message and based on the message about the acceptance of the cooperative driving maneuver.

3. The method of claim 1, wherein the determination of the driving intention message is also based on the position of the transportation vehicle, and wherein the driving intention message also comprises information about the position of the transportation vehicle and/or information about a driving lane currently being used by the transportation vehicle.

4. The method of claim 1,
wherein the driving intention message also comprises the information about the planned implementation of the driving maneuver.

5. A method for a transportation vehicle for carrying out a cooperative driving maneuver, the method comprising:
obtaining a driving intention message from a requesting transportation vehicle, wherein the driving intention message comprises information about an intention of a driver, or an at least partially automatic transportation vehicle control system, of the requesting transportation vehicle to carry out a driving maneuver;
obtaining one or more further driving intention messages from transportation vehicles in an environment of the transportation vehicle, wherein the one or more further driving intention messages comprise information about one or more driving intentions of the transportation vehicles in an environment of transportation vehicle;
calculating the cooperative driving maneuver based on the driving intention message of the requesting transportation vehicle and on the one or more further driving intention messages of the transportation vehicles in an environment of the transportation vehicle, wherein the calculation comprises checking whether the cooperative maneuver is compatible with the one or more driving intentions of the transportation vehicles in an environment of the transportation vehicle;
calculating information about a planned implementation of the driving maneuver based on the position of the transportation vehicle,
wherein the information about the planned implementation of the driving maneuver comprises information about at least one element of the set of first possible planned lane change point, last possible lane change point, and phase of the driving maneuver;
receiving a message, as a vehicle-to-vehicle message, about an acceptance of the cooperative driving maneuver in response to the driving intention message, from at least one of the transportation vehicles in the environment of the transportation vehicle, the acceptance message including an acceptance and information about an intended type of maneuver of the at least one of the transportation vehicles in the environment,
wherein the calculation of the transmission parameters is additionally based on the message about the acceptance of the cooperative driving maneuver,
and
providing a driving assistance to implement the cooperative driving maneuver provided the cooperative maneuver is compatible with the one or more further driving intention messages of the transportation vehicles in an environment of the transportation vehicle.

6. The method of claim 5, further comprising:
obtaining information about a driving intention on the part of the transportation vehicle, wherein the calculation is additionally based on the information about the transportation vehicle's own driving intention, wherein the checking step additionally checks whether the cooperative maneuver is compatible with the transportation vehicle's own driving intention, and wherein the provision is additionally based on whether the cooperative maneuver is compatible with the transportation vehicle's own driving intention.

7. The method of claim 6, wherein the driving maneuver is a single lane change to the left, wherein the calculation calculates the cooperative driving maneuver so the cooperative driving maneuver comprises a double lane change of the transportation vehicle to the left, in response to the driving intention on the part of the transportation vehicle comprising a lane change to the left, to facilitate the single lane change to the left of the requesting transportation vehicle.

8. A device for a transportation vehicle for initiating a cooperative driving maneuver by providing a driving intention message for transportation vehicles in an environment of the transportation vehicle, wherein the driving intention message comprises information about an intention of a driver of the transportation vehicle to carry out a driving maneuver, the device comprising:
an interface to obtain information about a driving intention, wherein the driving intention is based on the desire of the driver to carry out the driving maneuver;
a positioning module for determining a position of the transportation vehicle; and
a control module for:
controlling the interface, the positioning module and a vehicle-to-vehicle-interface,
determining the driving intention message, based on the information about the driving intention,
calculating transmission parameters for the driving intention message, wherein the transmission parameters comprise a repetition rate and a time of transmission, based on a desired minimum reception probability of the driving intention message, the driving intention and the position of the transportation vehicle,
providing the driving intention message as a direct vehicle-to-vehicle message via the vehicle-to-vehicle interface for the transportation vehicles in the environment of the transportation vehicle based on the transmission parameters, and
receiving a message, as a vehicle-to-vehicle message, about an acceptance of the cooperative driving maneuver in response to the driving intention message, from at least one of the transportation vehicles in the environment of the transportation vehicle, the acceptance message including an acceptance and information about an intended type of maneuver of the at least one of the transportation vehicles in the environment,
wherein the calculation of the transmission parameters is additionally based on the message about the acceptance of the cooperative driving maneuver,
wherein information about a planned implementation of the driving maneuver is calculated based on the position of the transportation vehicle, wherein the information about the planned implementation of the driving maneuver comprises information about at least one element of the set of first possible planned lane change point, last possible lane change point, and phase of the driving maneuver.

9. The device of claim 8, wherein the cooperative driving maneuver is implemented based on the driving intention message and based on the message about the acceptance of the cooperative driving maneuver.

10. The device of claim 8, wherein the determination of the driving intention message is also based on the position of the transportation vehicle, and wherein the driving intention message also comprises information about the position of the transportation vehicle and/or information about a driving lane currently being used by the transportation vehicle.

11. The device of claim 8, wherein the driving intention message also comprises the information about the planned implementation of the driving maneuver.

12. A device for a transportation vehicle for carrying out a cooperative driving maneuver, the device comprising:
- a vehicle-to-vehicle interface for:
  - obtaining a driving intention message from a requesting transportation vehicle, wherein the driving intention message comprises information about an intention of a driver, or an at least partially automatic transportation vehicle control system, of the requesting transportation vehicle to carry out a driving maneuver, and
  - obtaining one or more further driving intention messages from transportation vehicles in an environment of the transportation vehicle, wherein the one or more further driving intention messages comprise information about one or more driving intentions of the transportation vehicles in an environment of transportation vehicle; and
- a control module for:
  - controlling the vehicle-to-vehicle interface and an interface, calculating the cooperative driving maneuver based on the driving intention message of the requesting transportation vehicle and on the one or more further driving intention messages of the transportation vehicles in an environment of the transportation vehicle, wherein the calculation of the cooperative maneuver comprises checking whether the cooperative maneuver is compatible with the one or more driving intentions of the transportation vehicles in an environment of the transportation vehicle,
  - receiving a message, as a vehicle-to-vehicle message, about an acceptance of the cooperative driving maneuver in response to the driving intention message, from at least one of the transportation vehicles in the environment of the transportation vehicle, the acceptance message including an acceptance and information about an intended type of maneuver of the at least one of the transportation vehicles in the environment, wherein the calculation of the transmission parameters is additionally based on the message about the acceptance of the cooperative driving maneuver, and
  - providing a driving assistance to implement the cooperative driving maneuver via the interface, provided the cooperative maneuver is compatible with the one or more further driving intention messages of the transportation vehicles in an environment of the transportation vehicle,
  - wherein information about a planned implementation of the driving maneuver is calculated based on the position of the transportation vehicle, wherein the information about the planned implementation of the driving maneuver comprises information about at least one element of the set of first possible planned lane change point, last possible lane change point, and phase of the driving maneuver.

13. The device of claim 12, wherein information about a driving intention on the part of the transportation vehicle is obtained, wherein the calculation is additionally based on the information about the transportation vehicle's own driving intention, wherein the checking step additionally checks whether the cooperative maneuver is compatible with the transportation vehicle's own driving intention, and wherein the provision is additionally based on whether the cooperative maneuver is compatible with the transportation vehicle's own driving intention.

14. The device of claim 12, wherein the driving maneuver is a single lane change to the left, wherein the calculation calculates the cooperative driving maneuver so the cooperative driving maneuver comprises a double lane change of the transportation vehicle to the left, in response to the driving intention on the part of the transportation vehicle comprising a lane change to the left, to facilitate the single lane change to the left of the requesting transportation vehicle.

* * * * *